(12) United States Patent
Balin

(10) Patent No.: US 9,944,202 B2
(45) Date of Patent: Apr. 17, 2018

(54) POSITION ADJUSTMENT ASSEMBLY FOR VEHICLE SEATING

(71) Applicant: JOHNSON CONTROLS TECHNOLOGY COMPANY, Holland, MI (US)

(72) Inventor: Alexander I. Balin, Ann Arbor, MI (US)

(73) Assignee: Adient Luxembourg Holding S.A.R.L., Luxembourg (LU)

( * ) Notice: Subject to any disclaimer, the term of this patent is extended or adjusted under 35 U.S.C. 154(b) by 398 days.

(21) Appl. No.: 14/372,304

(22) PCT Filed: Jan. 29, 2013

(86) PCT No.: PCT/US2013/023540
§ 371 (c)(1),
(2) Date: Jul. 15, 2014

(87) PCT Pub. No.: WO2013/119411
PCT Pub. Date: Aug. 15, 2013

(65) Prior Publication Data
US 2015/0020643 A1   Jan. 22, 2015

Related U.S. Application Data

(60) Provisional application No. 61/595,498, filed on Feb. 6, 2012.

(51) Int. Cl.
  *E04G 3/00* (2006.01)
  *B60N 2/08* (2006.01)
(52) U.S. Cl.
  CPC .............. *B60N 2/08* (2013.01); *B60N 2/085* (2013.01); *B60N 2/0812* (2013.01); *Y10T 74/20714* (2015.01)

(58) Field of Classification Search
  CPC ........ B60N 2/08; B60N 2/0812; B60N 2/085; Y10T 74/20714
  (Continued)

(56) References Cited

U.S. PATENT DOCUMENTS 5,564,315 A * 10/1996 Schuler ............... B60N 2/0806
  248/424
6,216,995 B1 * 4/2001 Koester ............... B60N 2/0228
  248/429

(Continued)

FOREIGN PATENT DOCUMENTS

CN    101795599 A    8/2010
EP      1671836 A2   6/2006
(Continued)

OTHER PUBLICATIONS

PCT International Preliminary Report on Patentability for PCT Application No. PCT/US2013/023540.
(Continued)

*Primary Examiner* — Gwendolyn W Baxter
(74) *Attorney, Agent, or Firm* — Fletcher Yoder, P.C.

(57) ABSTRACT

A vehicle seating system includes a latch having multiple teeth configured to engage respective windows within a rail to selectively block movement of a vehicle seat relative to the rail. The latch includes a first tooth and a second tooth longitudinally separated from one another. The first tooth includes an inner surface configured to contact a longitudinal end of a first window while the first tooth is engaged with the first window to block movement of the latch relative to the rail along a first longitudinal direction, and the second tooth includes an inner surface configured to contact a longitudinal end of a second window while the second tooth is engaged with the second window to block movement of (Continued)

the latch relative to the rail along a second longitudinal direction, opposite the first longitudinal direction.

19 Claims, 5 Drawing Sheets

(58) Field of Classification Search
USPC ................................. 248/429; 297/344.11
See application file for complete search history.

(56) References Cited

U.S. PATENT DOCUMENTS

| 7,905,461 | B2* | 3/2011 | Noffz | B60N 2/0806 |
| | | | | 248/424 |
| 2003/0150971 | A1* | 8/2003 | Becker | B60N 2/0707 |
| | | | | 248/429 |
| 2006/0022109 | A1* | 2/2006 | Yamada | B60N 2/0715 |
| | | | | 248/429 |
| 2008/0048087 | A1* | 2/2008 | Kojima | B60N 2/0818 |
| | | | | 248/430 |
| 2009/0218843 | A1* | 9/2009 | Wojatzki | B60N 2/0705 |
| | | | | 296/65.13 |
| 2010/0133407 | A1* | 6/2010 | Fujieda | B60N 2/0727 |
| | | | | 248/429 |
| 2011/0193389 | A1* | 8/2011 | Wojatzki | B60N 2/0705 |
| | | | | 297/344.1 |
| 2011/0240821 | A1* | 10/2011 | Couasnon | B60N 2/0705 |
| | | | | 248/429 |
| 2012/0001049 | A1* | 1/2012 | Selbold | B60N 2/0818 |
| | | | | 248/429 |

FOREIGN PATENT DOCUMENTS

| JP | S61-103234 | 7/1986 |
| JP | H06-048230 | 2/1994 |
| JP | H09-104265 | 4/1997 |
| JP | 2007-126080 | 5/2007 |
| JP | 2008-143342 | 6/2008 |
| WO | 2009128848 A1 | 10/2009 |
| WO | 2010080597 | 7/2010 |

OTHER PUBLICATIONS

International Search Report & Written Opinion for application No. PCT/US2013/023540 dated May 5, 2013.
Japanese Office Action dated Aug. 4, 2015.
Korean Office Action dated Aug. 26, 2015.
Chinese Application No. 201380008156.8 Office Action dated Oct. 20, 2015.

* cited by examiner though is configured to block movement of the latch relative to the rail along a first longitudinal direction while a first contact force between the engagement surface of the first tooth and a longitudinal end of a first window is less than a first threshold value, the engagement surface of the first tooth is angled to direct the longitudinal end of the first window toward the locking surface of the first tooth while the first contact force is greater than or equal to the first threshold value, and the locking surface of the first tooth is configured to block movement of the latch relative to the rail upon contact between the locking surface of the first tooth and the longitudinal end of the first window. The second tooth includes an engagement surface and a locking surface, the engagement surface of the second tooth is configured to block movement of the latch relative to the rail along a second longitudinal direction, opposite the first longitudinal direction, while a second contact force between the engagement surface of the second tooth and a longitudinal end of a second window is less than a second threshold value, the engagement surface of the second tooth is angled to direct the longitudinal end of the second window toward the locking surface of the second tooth while the second contact force is greater than or equal to the second threshold value, and the locking surface of the second tooth is configured to block movement of the latch relative to the rail upon contact between the locking surface of the second tooth and the longitudinal end of the second window.

POSITION ADJUSTMENT ASSEMBLY FOR VEHICLE SEATING

CROSS REFERENCE TO RELATED APPLICATIONS

This application claims priority from and the benefit of PCT Application No. PCT/US2013/023059, filed on Jan. 29, 2013, and the benefit of U.S. Provisional Application Ser. No. 61/595,498, entitled "POSITION ADJUSTMENT ASSEMBLY FOR VEHICLE SEATING", filed Feb. 6, 2012, which is hereby incorporated by reference in its entirety.

BACKGROUND

The invention relates generally to vehicle seating, and more specifically, to a position adjustment assembly configured to adjust a position of a seat relative to a vehicle interior.

Vehicle seating typically includes a seat bottom and a seat back to support a driver or passenger. In certain seating configurations, both the seat bottom and seat back include a rigid chassis, cushions, and a fabric covering. The cushions are coupled to the rigid chassis, and the fabric covering is disposed about the assembly. The rigid chassis of the seat bottom serves to support the weight (i.e., vertical load) of the passenger, and couples the seat to a floor of the vehicle. In certain configurations, the seat bottom chassis is coupled to a carriage configured to facilitate longitudinal movement of the vehicle seating along a track. In addition, the seat back chassis may be configured to pivot relative to the seat bottom chassis to enable a passenger to adjust the seat back to a desired position.

Certain vehicle seating systems include a position adjustment assembly configured to adjust a longitudinal position of a seat relative to a vehicle interior. Certain position adjustment assemblies include an upper rail mounted to the vehicle seat, and a lower rail mounted to the floor of the vehicle interior. The upper rail is engaged with the lower rail, and configured to translate relative to the lower rail to adjust the longitudinal position of the seat. In certain configurations, the position adjustment assembly also includes a latch coupled to the upper rail. The latch includes multiple teeth configured to engage windows of the lower rail to selectively block longitudinal movement of the seat.

In certain configurations, the latch extends from an arm configured to urge the latch into engagement. In such configurations, the arm may be constructed from a resilient material, such as spring steel. Unfortunately, during a high g-force event, a contact force between the teeth and the respective windows may induce the arm to deform, thereby varying an angle of the teeth relative to the windows. As a result, the teeth may slip out of the respective windows, thereby enabling the upper rail to translate relative to the lower rail, and enabling the seat to move relative to the vehicle interior.

BRIEF DESCRIPTION OF THE INVENTION

The present invention relates to a vehicle seating system including a latch having multiple teeth configured to engage respective windows within a rail to selectively block movement of a vehicle seat relative to the rail. The latch includes a first tooth and a second tooth longitudinally separated from one another. The first tooth includes an engagement surface and a locking surface, the engagement surface of the first The present invention also relates to a vehicle seating system including a latch having a first tooth configured to engage a first window within a rail to selectively block movement of a vehicle seat relative to the rail. The first tooth includes an engagement surface and a locking surface, the engagement surface of the first tooth is configured to block movement of the latch relative to the rail along a first longitudinal direction while a first contact force between the engagement surface of the first tooth and a longitudinal end of a first window is less than a first threshold value, the engagement surface of the first tooth is angled to direct the longitudinal end of the first window toward the locking surface of the first tooth while the first contact force is greater than or equal to the first threshold value, and the locking surface of the first tooth is configured to block movement of the latch relative to the rail upon contact between the locking surface of the first tooth and the longitudinal end of the first window.

The present invention further relates to a vehicle seating system including a latch having multiple teeth configured to engage respective windows within a rail to selectively block movement of a vehicle seat relative to the rail. The latch includes a first tooth and a second tooth longitudinally separated from one another. The first tooth includes an inner surface configured to contact a longitudinal end of a first window while the first tooth is engaged with the first window to block movement of the latch relative to the rail along a first longitudinal direction, and the second tooth includes an inner surface configured to contact a longitudinal end of a second window while the second tooth is engaged with the second window to block movement of the latch relative to the rail along a second longitudinal direction, opposite the first longitudinal direction.

DRAWINGS

DETAILED DESCRIPTION

Figure 1:
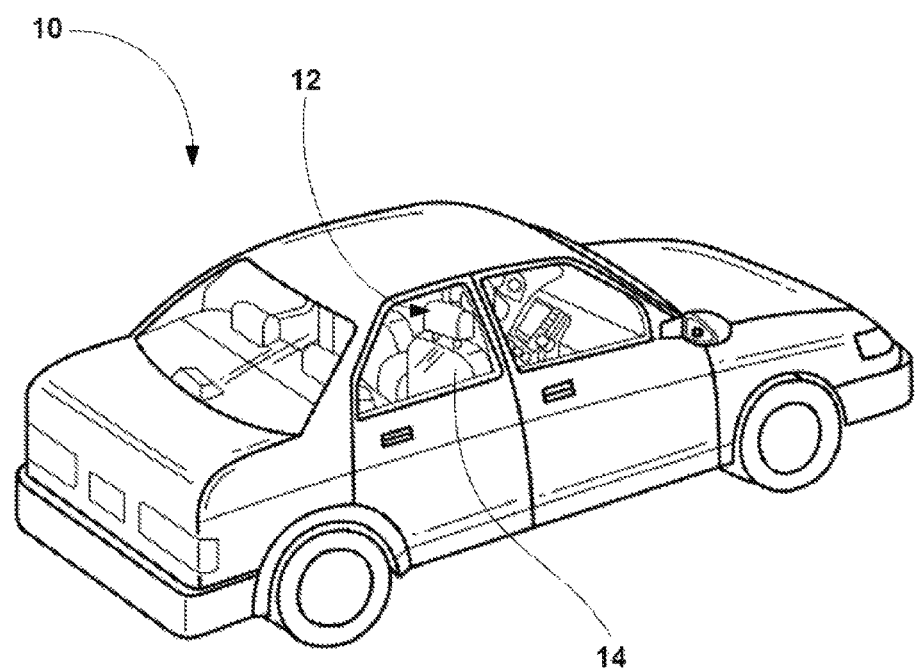
FIG. 1 is a perspective view of an exemplary vehicle that may include a seat having a position adjustment assembly.

FIG. 1 is a perspective view of an exemplary vehicle 10 including seating having a position adjustment assembly. As illustrated, the vehicle 10 includes an interior 12 having a seat 14. As discussed in detail below, the seat 14 may include a position adjustment assembly configured to adjust a longitudinal position of the seat 14 relative to the vehicle interior 12. For example, in certain embodiments, the position adjustment assembly includes a latch having multiple teeth configured to engage respective windows within a rail to selectively block movement of the seat 14 relative to the rail. The latch includes a first tooth and a second tooth longitudinally separated from one another. The first tooth includes an inner surface configured to contact a longitudinal end of a first window while the first tooth is engaged with the first window, thereby blocking movement of the latch relative to the rail along a first longitudinal direction. Similarly, the second tooth includes an inner surface configured to contact a longitudinal end of a second window while the second tooth is engaged with the second window, thereby blocking movement of the latch relative to the rail along a second longitudinal direction, opposite the first longitudinal direction. Consequently, if a force is applied to the seat 14 in the second longitudinal direction (e.g., via a frontal impact), contact between the second tooth and the longitudinal end of the second window induces a torque about the contact point, thereby driving the first tooth farther into the first window. Conversely, if a force is applied to the seat 14 in the first longitudinal direction (e.g., via a rear impact), contact between the first tooth and the longitudinal end of the first window induces a torque about the contact point, thereby driving the second tooth into the second window. Because the teeth remain within their respective windows during the application of the force, the energy associated with an impact is distributed across each of the teeth, thereby substantially reducing or eliminating the possibility of seat movement during the impact.

Figure 2:
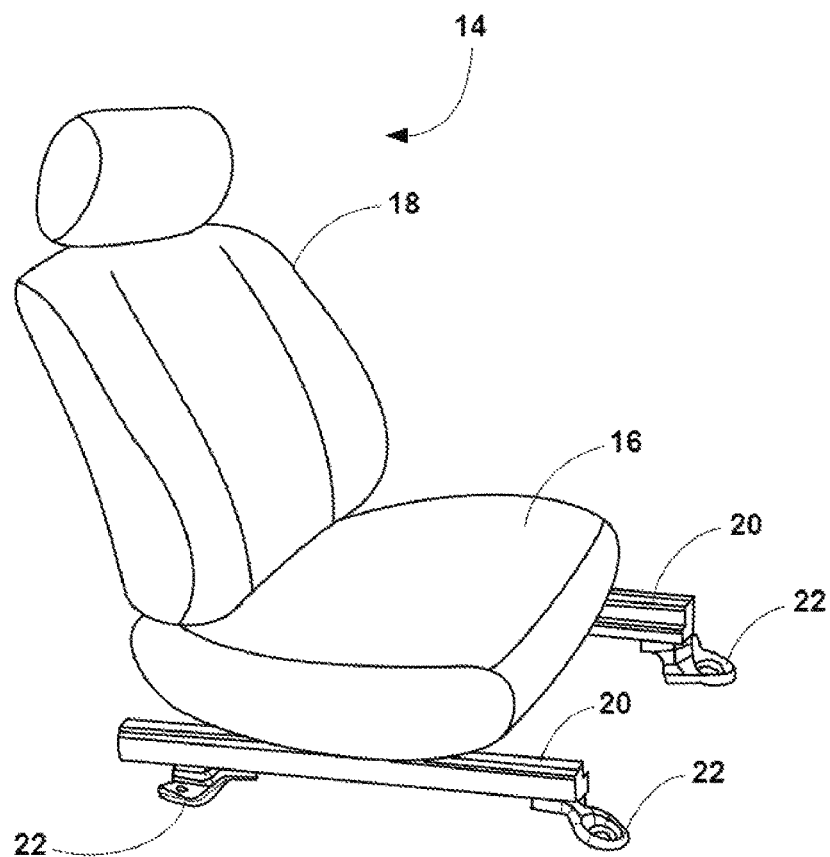
FIG. 2 is a front perspective view of an exemplary seat including a seat bottom and a seat back.

FIG. 2 is a front perspective view of an exemplary seat 14 including a seat bottom 16 and a seat back 18. In the present embodiment, the seat bottom 16 includes a seat bottom chassis, one or more cushions, and a fabric covering. The seat bottom chassis serves to support the weight of a passenger during normal vehicle operation and during high g-force events (e.g., rapid acceleration or deceleration, etc.). The seat bottom chassis also secures the seat bottom 16 to a floor of the vehicle 10, and provides a mounting surface for the seat back 18. One or more cushions may be coupled to the seat bottom chassis to provide passenger comfort, and the fabric covering may be disposed about the assembly to provide a desired appearance and/or to protect the internal components of the seat bottom 16. The seat back 18 may be constructed in a similar manner, i.e., from one or more cushions secured to a rigid chassis and wrapped with a fabric covering.

As illustrated, the seat bottom 16 is secured to a position adjustment assembly 20 having an upper rail and a lower rail. The upper rail is coupled to the seat bottom 16, and the lower rail is mounted to the floor of the vehicle 10 by mounting feet 22. As discussed in detail below, the upper rail is configured to move relative to the lower rail to facilitate longitudinal position adjustment of the seat 14 relative to the vehicle interior 12. As will be appreciated, adjustment of the seating position may be either manual or assisted. For example, an electric motor may be configured to drive the seat 14 in a forward or backward direction by a suitable mechanism such as a rack and pinion system. In addition, the seat back 18 may be configured to recline with respect to the seat bottom 16. Adjustment of the seat back 18 may also be either manual or assisted by an electric motor, for example.

As discussed in detail below, the position adjustment assembly 20 includes a latch having multiple teeth configured to engage respective windows within the lower rail to selectively block movement of the seat 14 relative to the vehicle interior 12. The latch includes a first tooth and a second tooth longitudinally separated from one another. An inner surface of each tooth is configured to contact a longitudinal end of a respective window, thereby blocking movement of the latch relative to the lower rail. In this configuration, if a force is applied to the seat 14 in either longitudinal direction (e.g., via a vehicular impact), contact between a tooth and the longitudinal end of a respective window induces a torque about the contact point, thereby driving the other tooth farther into the respective window. Because the teeth remain within their respective windows during the application of the force, the energy associated with an impact is distributed across each of the teeth, thereby substantially reducing or eliminating the possibility of seat movement during the impact.

In certain embodiments, each tooth includes an engagement surface and a locking surface. The engagement surface is angled to direct the longitudinal end of the respective window toward the locking surface upon application of a contact force greater than or equal to a threshold value. In addition, the locking surface is configured to block movement of the latch relative to the lower rail upon contact between the locking surface and the longitudinal end of the respective window. Because the locking surface is configured to block movement of the latch, the engagement surface may be shaped to facilitate engagement and disengagement of the tooth from the window. In addition, because the locking surface is configured to mechanically capture the longitudinal end of the window, the shape of each tooth may be less sensitive to dimensional variations, and/or the surface of each tooth may be less sensitive to the coefficient of friction, as compared to a tooth configured to block movement of the latch by engaging the longitudinal end of the window at a locking angle. As a result, the manufacturing costs associated with forming the latch may be substantially reduced.

Figure 3:
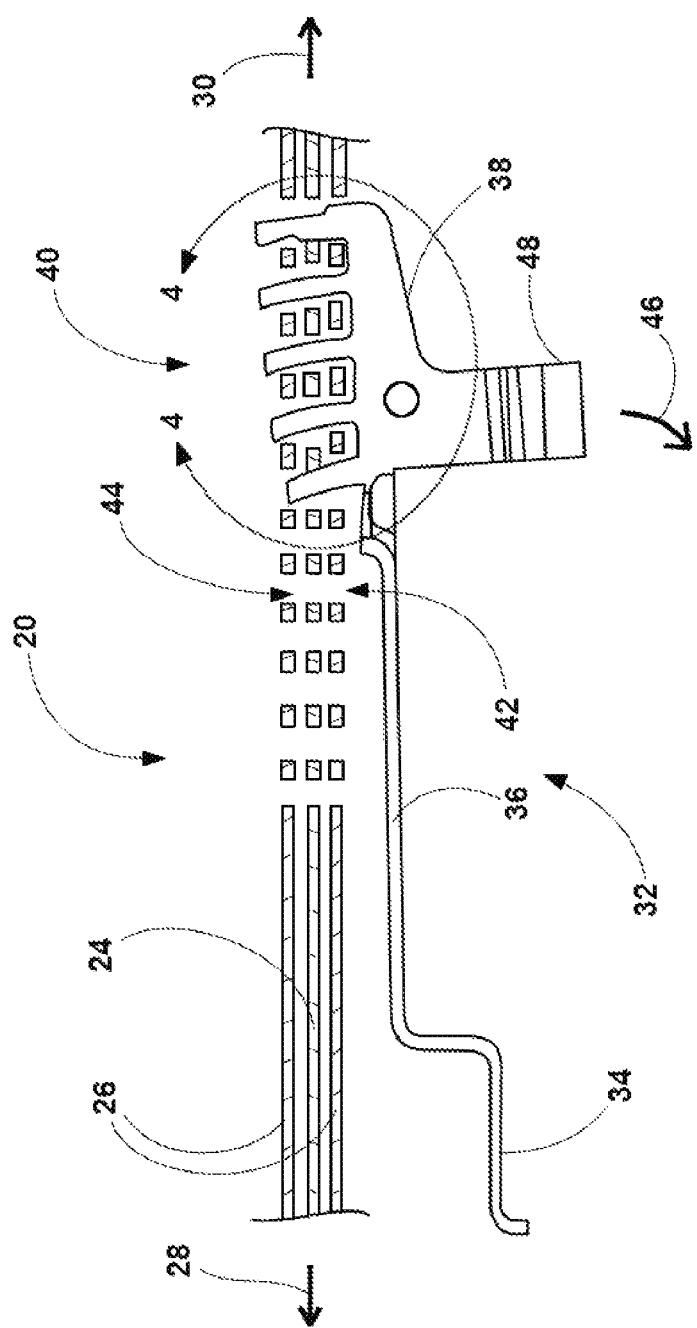
FIG. 3 is a cross-sectional view of an embodiment of a position adjustment assembly, including a latch configured to engage a rail to selectively block movement of a seat.

FIG. 3 is a cross-sectional view of an embodiment of a position adjustment assembly 20, including a latch configured to engage a rail to selectively block movement of the seat 14. In the illustrated embodiment, the position adjustment assembly 20 includes a lower rail 24 mounted to the floor of the vehicle 10 (e.g., via mounting feet 22), and an upper rail 26 mounted to the seat bottom 16. The upper rail 26 has a substantially c-shaped cross-section forming a recess configured to capture the lower rail 24. In this configuration, the vertical load of the seat 14 is transferred from the upper rail 26 to the lower rail 24, and then to the floor of the vehicle 10. The upper rail 26 is also configured to translate relative to the lower rail 24 to facilitate position adjustment of the seat 14. For example, the seat 14 may be translated in a forward direction (i.e., toward a steering wheel) via movement of the upper rail 26 in a first longitudinal direction 28 relative to the lower rail 24. Conversely, the seat 14 may be translated in a rearward direction (e.g., away from the steering wheel) via movement of the upper rail 26 in a second longitudinal direction 30 relative to the lower rail 24. In this manner, the seat 14 may be adjusted to a desirable position for driver or passenger comfort.

In the illustrated embodiment, the position adjustment assembly 20 includes a latch assembly 32 having an attachment member 34, an arm 36, and a latch 38. The attachment member 34 is configured to couple to the upper rail 26, thereby securing the latch assembly 32 to the vehicle seat 14. As illustrated, the latch 38 includes multiple teeth 40 configured to engage respective upper rail windows 42 of the upper rail 26 and respective lower rail windows 44 of the lower rail 24. With the teeth 40 disposed within the upper rail windows 42 and the lower rail windows 44, movement of the upper rail 26 relative to the lower rail 24 is blocked, thereby blocking movement of the seat 14 relative to the vehicle interior 12. In certain embodiments, the latch assembly 32 is formed from a single piece of resilient material, such as spring steel, for example. In such embodiments, the arm 36 urges the teeth 40 into the upper rail windows 42 and the lower rail windows 44, thereby blocking movement of the upper rail 26 relative to the lower rail 24. To facilitate movement of the seat 14, the latch 38 may be driven in the direction 46 against the bias of the arm 36, thereby removing the teeth 40 from the lower rail windows 44. As a result, the upper rail 26 may move in the first longitudinal direction 28 or the second longitudinal direction 30. In certain embodiments, an actuator may be coupled to the latch 38 via a tab 48, thereby enabling a driver or passenger to adjust the seat 14 to a desired position.

As discussed in detail below, an inner surface of a first tooth positioned on one longitudinal end of the latch 38 is configured to contact a longitudinal end of a first window of the lower rail windows 44, and an inner surface of a second tooth positioned on the opposite longitudinal end of the latch 38 is configured to contact a longitudinal end of a second window of the lower rail windows 44. As a result, movement of the latch 38 relative to the lower rail 24 is blocked in the longitudinal directions 28 and 30. In addition, if a force is applied to the seat 14 in either longitudinal direction (e.g., via a vehicular impact), contact between the first tooth and the longitudinal end of the first window, or contact between the second tooth and the longitudinal end of the second window induces a torque about the contact point, thereby driving the other teeth farther into their respective lower rail windows. Because the teeth remain within their respective windows during the application of the force, the energy associated with an impact is distributed across each of the teeth, thereby substantially reducing or eliminating the possibility of seat movement during the impact.

Figure 4:
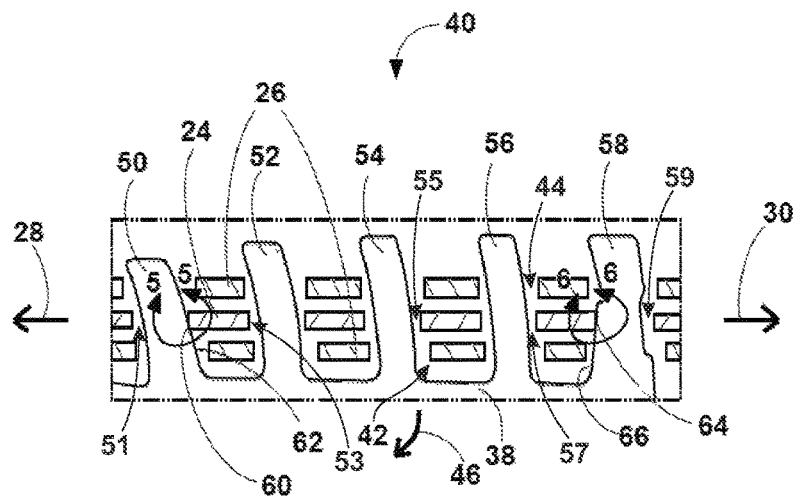
FIG. 4 is a detailed cross-sectional view of the latch shown in FIG. 3, taken within line 4-4.

FIG. 4 is a detailed cross-sectional view of the latch shown in FIG. 3, taken within line 4-4. In the illustrated embodiment, the latch 38 includes a first tooth 50 positioned on a first longitudinal end of the latch 38. The latch 38 also includes a second tooth 52 longitudinally offset from the first tooth 50 along the direction 30, a third tooth 54 longitudinally offset from the second tooth 52 along the direction 30, and a fourth tooth 56 longitudinally offset from the third tooth 54 along the direction 30. Furthermore, the latch 38 includes a fifth tooth 58 longitudinally offset from the fourth tooth 56 along the direction 30, and positioned on an opposite longitudinal end of the latch 38 from the first tooth 50. As previously discussed, the teeth 40 are configured to engage the upper rail windows 42 and the lower rail windows 44, thereby selectively blocking movement of the upper rail 26 relative to the lower rail 24. As illustrated, the first tooth 50 engages a first window 51 of the lower rail windows 44, the second tooth 52 engages a second window 53 of the lower rail windows 44, the third tooth 54 engages a third window 55 of the lower rail windows 44, the fourth tooth 56 engages a fourth window 57 of the lower rail windows 44, and the fifth tooth 58 engages a fifth window 59 of the lower rail windows 44. While five teeth 40 are included in the illustrated embodiment, it should be appreciated that alternative embodiments may include more or fewer teeth. For example, certain embodiments, may include 1, 2, 3, 4, 5, 6, 7, 8, 9, 10, or more teeth 40.

In the illustrated embodiment, the first tooth 50 is configured to block movement of the latch 38 in the second longitudinal direction 30 while the teeth 40 are engaged with the lower rail windows 44. As illustrated, contact between a longitudinal end 60 of the first window 51 and an engagement surface 62 of the first tooth 50 establishes a locking condition that blocks movement of the latch 38 in the direction 30. Because the latch assembly 32 is coupled to the seat 14 via the upper rail 26, rearward movement of the seat 14 relative to the vehicle interior 12 is blocked. Similarly, the fifth tooth 58 is configured to block movement of the latch 38 in the first longitudinal direction 28 while the teeth 40 are engaged with the lower rail windows 44. As illustrated, contact between a longitudinal end 64 of the fifth window 59 and an engagement surface 66 of the fifth tooth 58 establishes a locking condition that blocks movement of the latch 38 in the direction 28. Because the latch assembly 32 is coupled to the seat 14 via the upper rail 26, forward movement of the seat 14 relative to the vehicle interior is blocked.

Because the first tooth 50 is configured to block movement of the latch 38 in the second longitudinal direction 30, and the fifth tooth 58 is configured to block movement of the latch 38 in the first longitudinal direction 28, the latch 38 is held in the desired position while the teeth 40 are engaged with the lower rail windows 44. Consequently, movement of the seat 14 in the fore/aft direction is blocked by the latch 38. As discussed in detail below, if a force is applied to the seat 14 in the longitudinal direction 28 (e.g., via a frontal impact), contact between the fifth tooth 58 and the longitudinal end 64 of the fifth window 59 induces a torque about the contact point, thereby driving the first, second, third and fourth teeth farther into their respective lower rail windows. Conversely, if a force is applied to the seat 14 in the longitudinal direction 30 (e.g., via a rear impact), contact between the first tooth 50 and the longitudinal end 60 of the first window 51 induces a torque about the contact point, thereby driving the second, third, fourth and fifth teeth farther into their respective lower rail windows. Because the teeth remain within their respective windows during the application of the force, the energy associated with an impact is distributed across each of the teeth, thereby substantially reducing or eliminating the possibility of seat movement during the impact.

Figure 5:
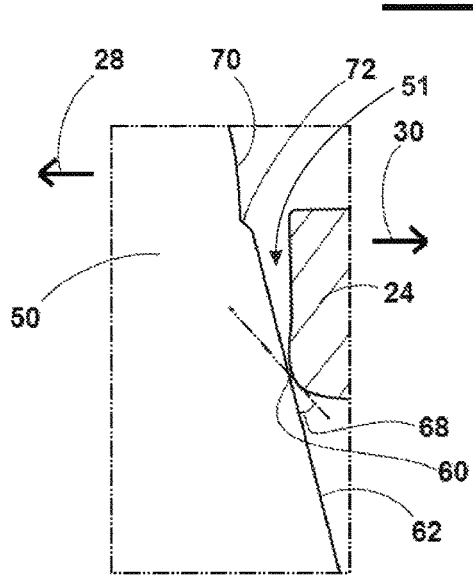
FIG. 5 is a detailed cross-sectional view of a first tooth of the latch shown in FIG. 4, taken within line 5-5.

FIG. 5 is a detailed cross-sectional view of the first tooth 50 of the latch 38 shown in FIG. 4, taken within line 5-5. In the illustrated embodiment, the engagement surface 62 of the first tooth 50 is configured to contact the longitudinal end 60 of the first window 51 at a locking angle 68, thereby establishing a locking condition that blocks movement of the latch 38 in the longitudinal direction 30 relative to the lower rail 24. A locking angle is an angle that establishes a sufficient friction force between the components to block lateral movement of the first tooth 50 relative to the first window 51. As will be appreciated, the locking angle is at least partially dependent upon the coefficient of friction between the components. For example, the locking angle 68 may be less than about 10 degrees, less than about 7 degrees, or less than about 5 degrees. By way of example, the locking angle 68 may be about 0 to 10 degrees, about 1 to 9 degrees, about 2 to 8 degrees, about 3 to 7 degrees, about 4 to 6 degrees, or about 5.5 degrees. Consequently, during normal vehicle operation, contact between the engagement surface 62 of the first tooth 50 and the longitudinal end 60 of the first window 51 blocks movement of the latch 38 in the longitudinal direction 30 relative to the lower rail 24, thereby blocking rearward movement of the seat 14 relative to the vehicle interior 12.

In the illustrated embodiment, the first tooth 50 also includes a locking surface 70 positioned adjacent to the engagement surface 62, and a recess 72 positioned between the engagement surface 62 and the locking surface 70. The locking surface 70 and the recess 72 are configured to block movement of the latch 38 relative to the lower rail 24 if an excessive force (e.g., from a vehicle impact) on the vehicle seat 14 induces the longitudinal end 60 of the first window 51 to slip relative to the engagement surface 62. For example, in the illustrated embodiment, the engagement surface 62 is configured to block movement of the latch 38 relative to the lower rail 24 along the longitudinal direction 30 while a contact force between the engagement surface 62 and the longitudinal end 60 of the first window 51 is less than a threshold value. In addition, the engagement surface 62 is angled to direct the longitudinal end 60 of the first window 51 toward the locking surface 70 upon application of a contact force greater than or equal to the threshold value. The locking surface 70, in turn, is oriented at a negative angle relative to the longitudinal end 60 of the first window 51, thereby blocking movement of the latch 38 relative to the lower rail 24 upon contact between the locking surface 70 and the longitudinal end 60 of the first window 51.

By way of example, during normal vehicle operation (e.g., vehicle acceleration, vehicle deceleration, etc.), the contact force between the engagement surface 62 of the first tooth 50 and the longitudinal end 60 of the first window 51 may be less than the threshold value. As a result, movement of the latch 38 relative to the lower rail 24 in the longitudinal direction 30 is blocked by contact between the engagement surface 62 and the longitudinal end 60 of the first window 51, thereby blocking movement of the seat 14 relative to the vehicle interior 12. However, during a high g-force event, such as a rear impact, the contact force between the engagement surface 62 and the longitudinal end 60 of the first window 51 may exceed the threshold value, thereby inducing the longitudinal end 60 of the first window 51 to slide along the engagement surface 62 to the recess 72. For example, in certain embodiments, the latch assembly 32 may be constructed from a single piece of resilient material, such as spring steel. In such embodiments, a contact force greater than the threshold value may induce the arm 36 to deform, thereby varying an angle between the tooth 50 and the lower rail 24. As a result, the longitudinal end 60 of the first window 51 may slide along the engagement surface 62 as the angle between the surfaces increases above the locking angle 68. Once the longitudinal end 60 of the first window 51 engages the recess 72, the locking surface 70 blocks further movement of the rail 24 relative to the latch 38, thereby blocking movement of the seat 14 relative to the vehicle interior 12. For example, the locking surface 70 may be oriented at a negative angle to establish a self-locking condition between the first tooth 50 and the longitudinal end 60 of the first window 51. That is, the engagement surface 62 and the locking surface 70 may be angled such that the recess 72 mechanically captures the longitudinal end 60 of the first window 51, thereby blocking movement of the latch 38 relative to the lower rail 24.

Because the locking surface 70 is configured to block movement of the latch 38 relative to the lower rail 24 during a high g-force event, the engagement surface 62 may be shaped to facilitate engagement and disengagement of the first tooth 50 from the first window 51. In addition, because the locking surface 70 is configured to mechanically capture the longitudinal end 60 of the first window 51, the shape of the tooth 50 may be less sensitive to dimensional variations, and/or the surface of the tooth 50 may be less sensitive to the coefficient of friction, as compared to a tooth configured to block movement of the latch by engaging the longitudinal end of the window at a locking angle. As a result, the manufacturing costs associated with forming the latch assembly 32 may be substantially reduced.

Figure 6:
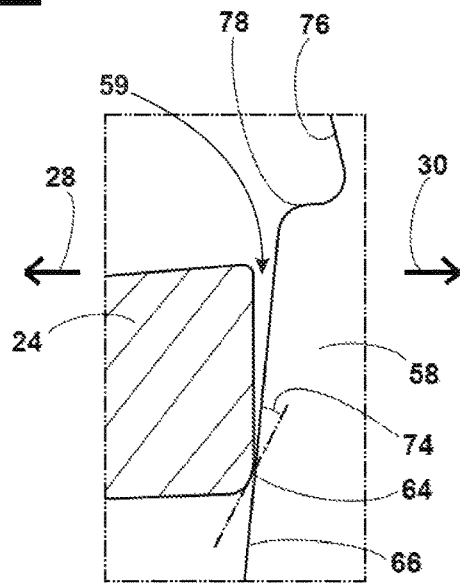
FIG. 6 is a detailed cross-sectional view of a fifth tooth of the latch shown in FIG. 4, taken within line 6-6.

FIG. 6 is a detailed cross-sectional view of the fifth tooth 58 of the latch 38 shown in FIG. 4, taken within line 6-6. In the illustrated embodiment, the engagement surface 66 of the fifth tooth 58 is configured to contact the longitudinal end 64 of the fifth window 59 at a locking angle 74, thereby establishing a locking condition that blocks movement of the latch 38 in the longitudinal direction 28 relative to the lower rail 24. As previously discussed, a locking angle is an angle that establishes a sufficient friction force between the components to block lateral movement of the fifth tooth 58 relative to the fifth window 59. For example, the locking angle 74 may be less than about 15 degrees, less than about 10 degrees, or less than about 5 degrees. By way of example, the angle locking 74 may be about 0 to 15 degrees, about 2 to 13 degrees, about 4 to 12 degrees, about 6 to 11 degrees, about 9 to 11 degrees, or about 10 degrees. Consequently, during normal vehicle operation, contact between the engagement surface 66 and the longitudinal end 64 of the fifth window 59 blocks movement of the latch 38 in the longitudinal direction 28 relative to the lower rail 24, thereby blocking forward movement of the seat 14 relative to the vehicle interior 12.

In the illustrated embodiment, the fifth tooth 58 also includes a locking surface 76 positioned adjacent to the engagement surface 66, and a recess 78 positioned between the engagement surface 66 and the locking surface 76. The locking surface 76 and the recess 78 are configured to block movement of the latch 38 relative to the lower rail 24 if an excessive force (e.g., from a vehicle impact) on the vehicle seat 14 induces the longitudinal end 64 of the fifth window 59 to slip relative to the engagement surface 66. For example, in the illustrated embodiment, the engagement surface 66 is configured to block movement of the latch 38 relative to the lower rail 24 along the longitudinal direction 28 while a contact force between the engagement surface 66 and the longitudinal end 64 of the fifth window 59 is less than a threshold value. In addition, the engagement surface 66 is angled to direct the longitudinal end 64 of the fifth window 59 toward the locking surface 76 upon application of a contact force greater than or equal to the threshold value. The locking surface 76, in turn, is oriented at a negative angle relative to the longitudinal end 64 of the fifth window 59, thereby blocking movement of the latch 38 relative to the lower rail 24 upon contact between the locking surface 76 and the longitudinal end 64 of the fifth window 59.

By way of example, during normal vehicle operation (e.g., vehicle acceleration, vehicle deceleration, etc.), the contact force between the engagement surface 66 of the fifth tooth 58 and the longitudinal end 64 of the fifth window 59 may be less than the threshold value. As a result, movement of the latch 38 relative to the lower rail 24 in the longitudinal direction 28 is blocked by contact between the engagement surface 66 and the longitudinal end 64 of the fifth window 59, thereby blocking movement of the seat 14 relative to the vehicle interior 12. However, during a high g-force event, such as a frontal impact, the contact force between the engagement surface 66 and the longitudinal end 64 of the fifth window 59 may exceed the threshold value, thereby inducing the longitudinal end 64 of the fifth window 59 to slide along the engagement surface 66 to the recess 78. For example, in certain embodiments, the latch assembly 32 may be constructed from a single piece of resilient material, such as spring steel. In such embodiments, a contact force greater than the threshold value may induce the arm 36 to deform, thereby varying an angle between the tooth 58 and the lower rail 24. As a result, the longitudinal end 64 of the fifth window 59 may slide along the engagement surface 66 as the angle between the surfaces increases above the locking angle 74. Once the longitudinal end 64 of the fifth window 59 engages the recess 78, the locking surface 76 blocks further movement of the rail 24 relative to the latch 38, thereby blocking movement of the seat 14 relative to the vehicle interior 12. For example, the locking surface 76 may be oriented at a negative angle to establish a self-locking condition between the fifth tooth 58 and the longitudinal end 64 of the fifth window 59. That is, the engagement surface 66 and the locking surface 76 may be angled such that the recess 78 mechanically captures the longitudinal end 64 of the fifth window 59, thereby blocking movement of the latch 38 relative to the lower rail 24.

Because the locking surface 76 is configured to block movement of the latch 38 relative to the lower rail 24 during a high g-force event, the engagement surface 66 may be shaped to facilitate engagement and disengagement of the fifth tooth 58 from the fifth window 59. In addition, because the locking surface 76 is configured to mechanically capture the longitudinal end 64 of the fifth window 59, the shape of the tooth 58 may be less sensitive to dimensional variations, and/or the surface of the tooth 58 may be less sensitive to the coefficient of friction, as compared to a tooth configured to block movement of the latch by engaging the longitudinal end of the window at a locking angle. As a result, the manufacturing costs associated with forming the latch assembly 32 may be substantially reduced.

While the first tooth 50 is configured to block movement of the latch 38 in the longitudinal direction 30, and the fifth tooth 58 is configured to block movement of the latch 38 in the longitudinal direction 28, it should be appreciated that other teeth may be utilized to block longitudinal movement of the latch 38 in alternative embodiments. For example, the second tooth 52 or the third tooth 54 may be configured to block movement of the latch 38 in the longitudinal direction 30. In addition, the third tooth 54 or the fourth tooth 56 may be configured to block movement of the latch 38 in the longitudinal direction 28. In such embodiments, the tooth configured to block movement of the latch may include an engagement surface and a locking surface, as described above with reference to the first tooth and the fifth tooth.

Figure 7:
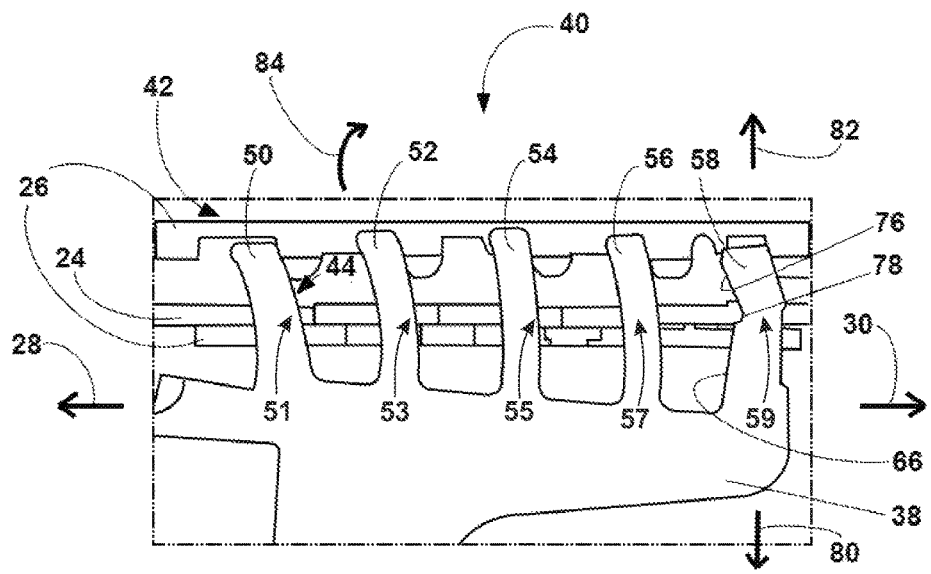
FIG. 7 is a detailed cross-sectional view of the latch shown in FIG. 3, after application of a force in a first longitudinal direction.

FIG. 7 is a detailed cross-sectional view of the latch 38 shown in FIG. 3, after application of a force in the first longitudinal direction 28. For example, a frontal impact may urge the seat 14 to move forwardly (i.e., toward the steering wheel), thereby driving the latch 38 in the longitudinal direction 28 relative to the lower rail 24. If a sufficient force is applied to the seat 14, the longitudinal end 64 of the fifth window 59 may slide along the engagement surface 66 of the fifth tooth 58 to the recess 78, as illustrated. Consequently, further movement of the latch 38 in the direction 28 is blocked by contact between the longitudinal end 64 of the fifth window 59 and the locking surface 76. In addition, because the longitudinal end 64 is engaged within the recess 78, movement in a first lateral direction 80, and movement in a second lateral direction 82 is blocked. As a result, the possibility of the fifth tooth 58 disengaging the fifth window 59 during a high g-force event is substantially reduced or eliminated.

Furthermore, as the force is applied to the seat 14 in the longitudinal direction 28 (e.g., during a frontal impact), contact between the fifth tooth 58 and the longitudinal end 64 of the fifth window 59 induces a torque about the recess 78 in the direction 84. As a result, the first tooth 50, the second tooth 52, the third tooth 54, and the fourth tooth 56 are driven farther into their respective lower rail windows 44. Because the teeth remain within their respective windows during the application of the force, the energy associated with an impact is distributed across each of the teeth, thereby substantially reducing or eliminating the possibility of seat movement during the impact.

Figure 8:
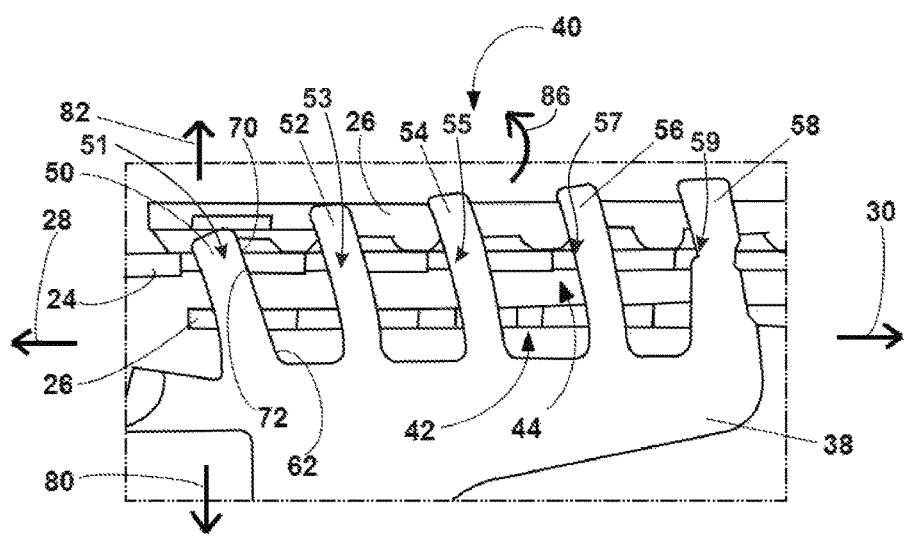
FIG. 8 is a detailed cross-sectional view of the latch shown in FIG. 3, after application of a force in a second longitudinal direction.

FIG. 8 is a detailed cross-sectional view of the latch 38 shown in FIG. 3, after application of a force in the second longitudinal direction 30. For example, a rear impact may urge the seat 14 to move in a rearward direction (i.e., away from the steering wheel), thereby driving the latch 38 in the longitudinal direction 30 relative to the lower rail 24. If a sufficient force is applied to the seat 14, the longitudinal end 60 of the first window 51 may slide along the engagement surface 62 of the first tooth 50 to the recess 72, as illustrated. Consequently, further movement of the latch 38 in the direction 30 is blocked by contact between the longitudinal end 60 of the first window 51 and the locking surface 70. In addition, because the longitudinal end 60 is engaged within the recess 72, movement in the first lateral direction 80, and movement in the second lateral direction 82 is blocked. As a result, the possibility of the first tooth 50 disengaging the first window 51 during a high g-force event is substantially reduced or eliminated.

Furthermore, as the force is applied to the seat 14 in the longitudinal direction 30 (e.g., during a rear impact), contact between the first tooth 50 and the longitudinal end 60 of the first window 51 induces a torque about the recess 72 in the direction 86. As a result, the second tooth 52, the third tooth 54, the fourth tooth 56, and the fifth tooth 58 are driven farther into their respective lower rail windows 44. Because the teeth remain within their respective windows during the application of the force, the energy associated with an impact is distributed across each of the teeth, thereby substantially reducing or eliminating the possibility of seat movement during the impact.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vehicle seating system, comprising:
a latch having a plurality of teeth configured to engage respective windows within a rail to selectively block movement of a vehicle seat relative to the rail, wherein the latch comprises a first tooth and a second tooth longitudinally separated from one another;
wherein the first tooth includes an engagement surface and a locking surface, the engagement surface of the first tooth is configured to block movement of the latch relative to the rail along a first longitudinal direction while a first contact force between the engagement surface of the first tooth and a longitudinal end of a first window is less than a first threshold value, the engagement surface of the first tooth is angled to direct the longitudinal end of the first window toward the locking surface of the first tooth while the first contact force is greater than or equal to the first threshold value, and the locking surface of the first tooth is configured to block movement of the latch relative to the rail upon contact between the locking surface of the first tooth and the longitudinal end of the first window; and
wherein the second tooth includes an engagement surface and a locking surface, the engagement surface of the second tooth is configured to block movement of the latch relative to the rail along a second longitudinal direction, opposite the first longitudinal direction, while a second contact force between the engagement surface of the second tooth and a longitudinal end of a second window is less than a second threshold value, the engagement surface of the second tooth is angled to direct the longitudinal end of the second window toward the locking surface of the second tooth while the second contact force is greater than or equal to the second threshold value, and the locking surface of the second tooth is configured to block movement of the latch relative to the rail upon contact between the locking surface of the second tooth and the longitudinal end of the second window.

2. The vehicle seating system of claim 1, wherein the latch extends from an arm of a latch assembly, and the latch assembly is coupled to the vehicle seat via an attachment member.

3. The vehicle seating system of claim 2, wherein the latch assembly is formed from a single piece of resilient material.

4. The vehicle seating system of claim 3, wherein the resilient material comprises spring steel.

5. The vehicle seating system of claim 1, wherein the engagement surface of the first tooth is configured to engage the longitudinal end of the first window at a first locking angle.

6. The vehicle seating system of claim 5, wherein the first locking angle is between about 4 to about 6 degrees.

7. The vehicle seating system of claim 1, wherein the engagement surface of the second tooth is configured to engage the longitudinal end of the second window at a second locking angle.

8. The vehicle seating system of claim 7, wherein the second locking angle is between about 9 to about 11 degrees.

9. The vehicle seating system of claim 1, wherein the latch is configured to urge the first tooth farther into the first window upon application of a first force to the vehicle seat in the second longitudinal direction.

10. The vehicle seating system of claim 1, wherein the latch is configured to urge the second tooth farther into the second window upon application of a second force to the vehicle seat in the first longitudinal direction.

11. A vehicle seating system, comprising:
a latch having a first tooth configured to engage a first window within a rail to selectively block movement of a vehicle seat relative to the rail, wherein the first tooth includes an engagement surface and a locking surface, the engagement surface of the first tooth is configured to block movement of the latch relative to the rail along a first longitudinal direction while a first contact force between the engagement surface of the first tooth and a longitudinal end of a first window is less than a first threshold value, the engagement surface of the first tooth is angled to direct the longitudinal end of the first window toward the locking surface of the first tooth while the first contact force is greater than or equal to the first threshold value, and the locking surface of the first tooth is configured to block movement of the latch relative to the rail upon contact between the locking surface of the first tooth and the longitudinal end of the first window.

12. The vehicle seating system of claim 11, wherein the latch comprises a resilient material.

13. The vehicle seating system of claim 11, wherein the latch comprises a second tooth offset from the first tooth along the first longitudinal direction, and the latch is configured to urge the second tooth farther into a second window upon application of a first force to the vehicle seat in the first longitudinal direction.

14. The vehicle seating system of claim 13, wherein the second tooth includes an engagement surface and a locking surface, the engagement surface of the second tooth is configured to block movement of the latch relative to the rail along a second longitudinal direction, opposite the first longitudinal direction, while a second contact force between the engagement surface of the second tooth and a longitudinal end of the second window is less than a second threshold value, the engagement surface of the second tooth is angled to direct the longitudinal end of the second window toward the locking surface of the second tooth while the second contact force is greater than or equal to the second threshold value, and the locking surface of the second tooth is configured to block movement of the latch relative to the rail upon contact between the locking surface of the second tooth and the longitudinal end of the second window.

15. The vehicle seating system of claim 14, wherein the latch is configured to urge the first tooth farther into the first window upon application of a second force to the vehicle seat in the second longitudinal direction.

16. A vehicle seating system, comprising:
a latch having a plurality of teeth configured to engage respective windows within a rail to selectively block movement of a vehicle seat relative to the rail, wherein the latch comprises a first tooth and a second tooth longitudinally separated from one another, and wherein the first tooth includes an inner surface configured to contact a longitudinal end of a first window while the first tooth is engaged with the first window to block movement of the latch relative to the rail along a first longitudinal direction, and the second tooth includes an inner surface configured to contact a longitudinal end of a second window while the second tooth is engaged with the second window to block movement of the latch relative to the rail along a second longitudinal direction, opposite the first longitudinal direction;
wherein the inner surface of the first tooth includes an engagement surface and a locking surface, the engagement surface of the first tooth is angled to direct the longitudinal end of the first window toward the locking surface of the first tooth upon application of a first contact force greater than or equal to a first threshold value, and the locking surface of the first tooth is configured to block movement of the latch relative to the rail upon contact between the locking surface of the first tooth and the longitudinal end of the first window; and
wherein the inner surface of the second tooth includes an engagement surface and a locking surface, the engagement surface of the second tooth is angled to direct the longitudinal end of the second window toward the locking surface of the second tooth upon application of a second contact force greater than or equal to a second threshold value, and the locking surface of the second tooth is configured to block movement of the latch relative to the rail upon contact between the locking surface of the second tooth and the longitudinal end of the second window.

17. The vehicle seating system of claim 16, wherein the latch comprises a resilient material.

18. The vehicle seating system of claim 17, wherein the latch is configured to urge the first tooth farther into the first window upon application of a first driving force to the vehicle seat in the second longitudinal direction, and the latch is configured to urge the second tooth farther into the second window upon application of a second driving force to the vehicle seat in the first longitudinal direction.

19. The vehicle seating system of claim 16, wherein the engagement surface of the first tooth is configured to engage the longitudinal end of the first window at a first locking angle, and the engagement surface of the second tooth is configured to engage the longitudinal end of the second window at a second locking angle.

* * * * *